(12) United States Patent
Harend et al.

(10) Patent No.: US 7,969,982 B2
(45) Date of Patent: Jun. 28, 2011

(54) METHOD AND DEVICE FOR PROCESSING REAL-TIME DATA

(75) Inventors: Roland Harend, Düsseldorf (DE); Robert Morelj, Munich (DE); Ingo Volkening, Rhu Cross (SG)

(73) Assignee: Lantiq Deutschland GmbH, Neubiberg (DE)

( * ) Notice: Subject to any disclaimer, the term of this patent is extended or adjusted under 35 U.S.C. 154(b) by 1267 days.

(21) Appl. No.: 10/545,917

(22) PCT Filed: Jun. 4, 2004

(86) PCT No.: PCT/EP2004/006080
§ 371 (c)(1),
(2), (4) Date: Jun. 15, 2006

(87) PCT Pub. No.: WO2004/112341
PCT Pub. Date: Dec. 23, 2004

(65) Prior Publication Data
US 2007/0165637 A1 Jul. 19, 2007

(30) Foreign Application Priority Data

Jun. 18, 2003 (DE) ................... 103 27 545

(51) Int. Cl.
*H04L 12/28* (2006.01)
*H04L 12/66* (2006.01)
*H04J 1/02* (2006.01)

(52) U.S. Cl. ........ 370/392; 370/352; 370/401; 370/493; 709/224

(58) Field of Classification Search ................... 370/229, 370/230–235, 352–401; 709/201, 231, 233, 709/234, 204–226, 236–241; 726/13, 27
See application file for complete search history.

(56) References Cited

U.S. PATENT DOCUMENTS

| | | | | |
|---|---|---|---|---|
| 6,449,650 B1 * | 9/2002 | Westfall et al. | ............... | 709/228 |
| 6,570,849 B1 * | 5/2003 | Skemer et al. | ............. | 370/230.1 |
| 6,584,108 B1 * | 6/2003 | Chung et al. | .................. | 370/401 |
| 6,594,268 B1 * | 7/2003 | Aukia et al. | .................. | 370/400 |
| 6,678,246 B1 * | 1/2004 | Smyth | ........................... | 370/230 |
| 6,904,040 B2 * | 6/2005 | Salapura et al. | ......... | 370/395.32 |
| 7,436,844 B2 * | 10/2008 | Wang et al. | .................. | 370/412 |
| 7,477,599 B2 * | 1/2009 | Lee et al. | .................... | 370/230.1 |
| 7,688,820 B2 * | 3/2010 | Forte et al. | .................... | 370/389 |
| 2002/0064157 A1 * | 5/2002 | Krause | ........................ | 370/393 |
| 2002/0191543 A1 * | 12/2002 | Buskirk et al. | ............. | 370/230.1 |
| 2003/0152065 A1 * | 8/2003 | Chang et al. | ................... | 370/352 |
| 2003/0189943 A1 * | 10/2003 | Gorti et al. | .................... | 370/330 |
| 2006/0193291 A1 * | 8/2006 | Kato et al. | ..................... | 370/329 |
| 2006/0227752 A1 * | 10/2006 | Sashihara | .................... | 370/338 |
| 2007/0115988 A1 * | 5/2007 | Miller | ........................... | 370/392 |
| 2008/0025308 A1 * | 1/2008 | Morgan et al. | ................ | 370/392 |

FOREIGN PATENT DOCUMENTS

| DE | 100 58 524 A1 | 6/2002 |
|---|---|---|
| EP | 1 280 297 A2 | 1/2003 |
| WO | WO 99/65196 | 12/1999 |

* cited by examiner

Primary Examiner — Man Phan
(74) Attorney, Agent, or Firm — SpryIP, LLC

(57) ABSTRACT

A method and a device are disclosed for processing data packets which comprise real-time data packets. The data packets are classified first by a co-processor unit into at least one first data packet type comprising real-time data packets, and a second data packet type. The data packets of the first data packet type are processed via a first data path with a further co-processor unit while the data packets of the second data packet type are processed via a second data path which comprises a main processor unit. Thus real-time data packets are processed without using the main processor unit.

27 Claims, 3 Drawing Sheets

METHOD AND DEVICE FOR PROCESSING REAL-TIME DATA

BACKGROUND

The present invention concerns a method and a device for processing data packets which comprise real-time data packets. In particular it concerns a method and a device for processing real-time data packets with speech or similar communication data which are transmitted via an IP network.

The transmission of real-time data over communication networks such as for example the Internet is becoming increasingly important. The best-known example of this is so-called Voice over IP applications in which for example speech data is transmitted so that a conversation is possible over the network. As well as speech data such real-time data may also include video data or similar.

Conventional devices for reception or transmission of such data use a single data path via a main processor of the device. This main processor then processes this real-time data. It is however also responsible for a multiplicity of other tasks and data processing which occur in the device concerned, for example a micro-computer.

Therefore such devices are dependent on the speed and data processing capacity of this single main processor. Overload of the main processor can lead to problems such as loss of data packets, jitter, run-time fluctuations or other delays. In the case of speech data for example this leads to a reduction in the quality of transmission and in the worst case to loss or interruption of the connection.

Conventionally, by using additional protocols in the data packets, the real-time data packet is given a high priority in processing. This does not however solve the main problem of possible overload of the main processor and leads at least to a delayed processing of other data packets. Also a relatively high processing and implementation cost is associated with this procedure.

One advantage of the present invention is that it can provide a method and a device with which processing of real-time data is possible with high reliability, leading to improved quality of the connection ("Quality of Service", QoS).

SUMMARY

When processing data packets which comprise real-time data packets, it is proposed to classify the data packets as at least one first data packet type which comprises or is allocated to real-time data packets, and a second data packet type, and process the data packets of the first data packet type via a first data path and the data packets of the second data packet type via a second data path. The second data packet type can comprise data packets with control or signalling information, in particular relating to the connection concerned.

Preferably the first data path has a shorter delay in processing or transmission of data packets than the second data path. In particular the second data path can comprise a main processor, whereas in the first data path the data packets can be processed for example by co-processors.

This relieves the load on the main processor and the real-time data packets can be processed via the first data path with a shorter delay.

To classify the data, connection data for the exchange of real-time data packets with a communication device can be stored and the data packets can be classified as data packets of the first data packet type when at least part of the connection data of the data packet corresponds to the stored connection data. This utilises the principle that such connection data changes little or not at all during a connection and hence allows classification of data packets.

Such connection data can be a network address of a sender of a data packet or a port on which the data packets are received. Classification of the data can take place via a processor unit, in particular a co-processor. The memory is administered preferably via a main processor unit.

Advantageously the utilisation or availability of the first data path is monitored, and the packets of the first data packet type are transmitted for processing exceptionally via the second data path if the utilisation of the first data path exceeds a prespecified value or the first data path is not available. Thus redundancy is created and in the case of faults or failures of the first data path mainly provided for real-time data packets, the second data path can be used which allows a more reliable connection.

The real-time data packets for example comprise speech data so that the invention is particularly suitable for Voice over IP applications.

The invention is described below with reference to the enclosed drawing showing preferred embodiment examples. Therein:

DESCRIPTION

Figure 1:
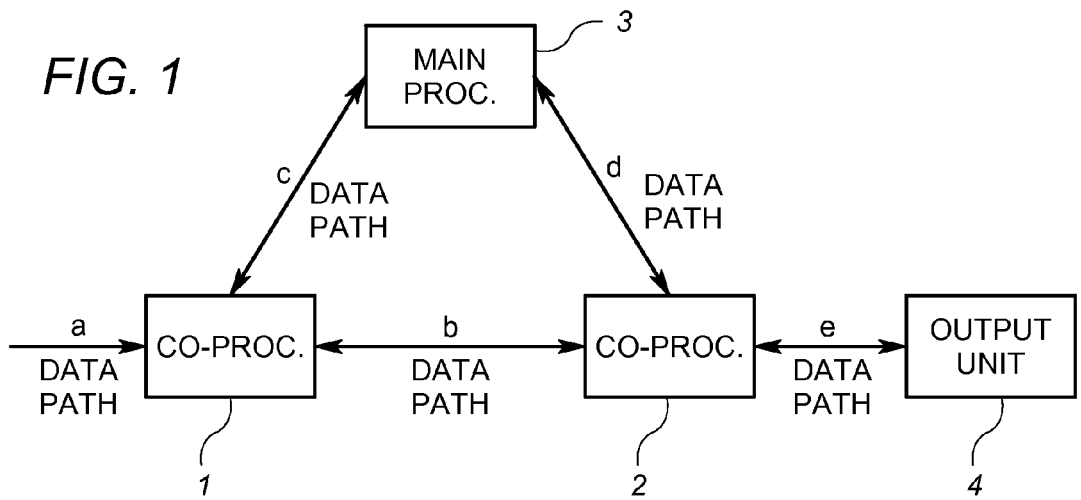
FIG. 1 shows a block circuit diagram of an embodiment example of a device according to the invention.

FIG. 1 shows an embodiment example for a device according to the invention in the form of a block circuit diagram. The embodiment example concerns the reception of data packets from a communication network (not shown) such as for example the Internet. A corresponding device would also be possible for the transmission of data.

Incoming data packets which comprise real-time data packets are received via a data path a and passed to a co-processor 1, referred to below as a packet co-processor. In this packet co-processor 1 the incoming data packets are examined and classified into at least two types of data packets, where real-time data packets are allocated to the first data packet type. Other data packets which for example comprise control signals for a connection via which the data packets are received, are allocated to a second data packet type. Suitable criteria for this classification will be described in more detail below.

Data packets of the first data packet type i.e. real-time data packets such as for example data packets with speech data, are sent via a first data path b to a further co-processor 2 for processing, in the case of speech data a speech co-processor. This can again check whether they are in fact the desired real-time data. If so, the co-processor 2 can process the data packet and for example pass the speech data via a data path e to a subsequent unit 4 for processing and output of the speech data.

Data packets of the second data packet type are passed via a first part c of a second data path to a main processor 3 ("Central Processing Unit", CPU) for processing. The second data path can contain a second part d with which the further co-processor 2 can also send data packets to the main processor 3 if it is found that these are not the desired real-time data packets.

By means of the first data path b thus incoming real-time data packets can be processed without the aid of the main processor 3 merely by co-processors 1 and 2. This firstly relieves the load on the main processor and secondly allows faster processing of the data and hence a reduction in delays in the data flow as the first data path b is used solely for these real-time data packets.

In addition the availability of the first data path b can be monitored. If it is found that the first data path b is not available, for example due to overload or because of an interruption, data packets of the first data packet type i.e. real-time data packets can be passed via the second data path c to the main processor unit and then on via paths d and e to the subsequent unit 4. Thus functioning of the system is ensured even for the case that the first data path b is not available (redundancy).

Figure 2:
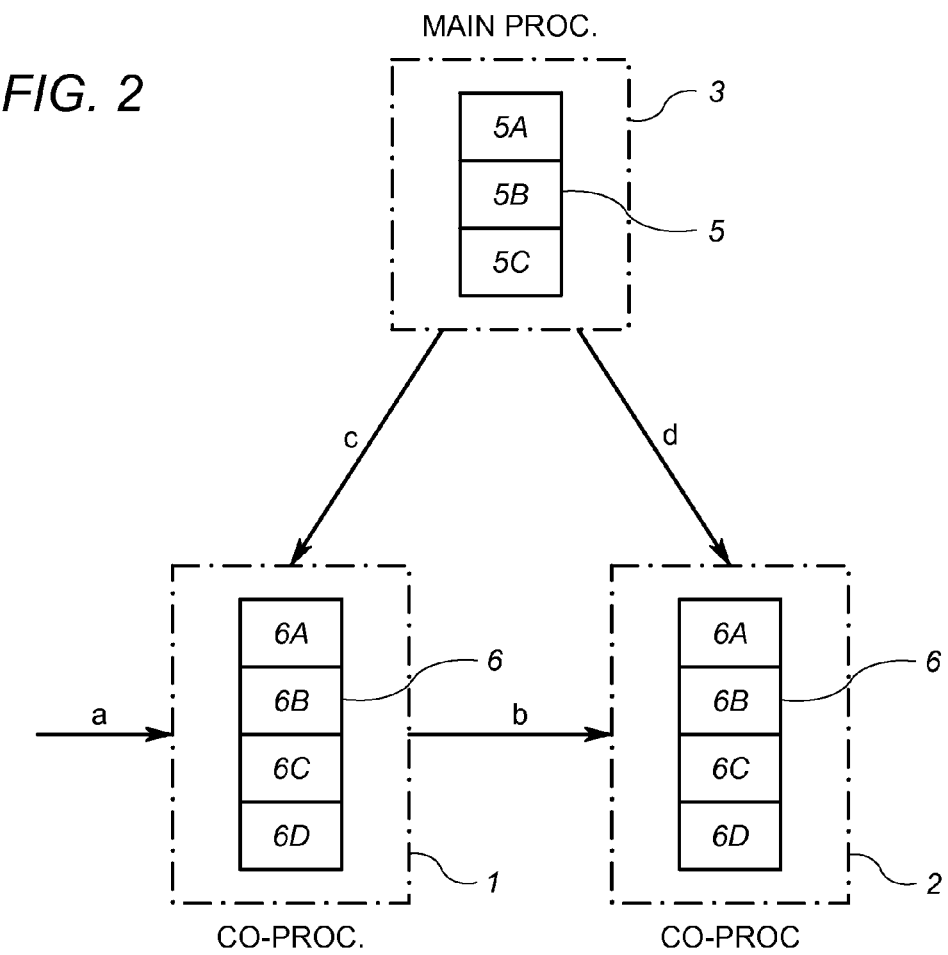
FIG. 2 shows an illustration for classification of data packets using connection data.

FIG. 2 depicts as an example the classification of data packets using so-called header parameters, i.e. parameters which contain information on a connection in a communication network. Such header parameters are placed before the actual data in a data packet and remain substantially unchanged during the connection. When a connection is initialised, for example for reception of speech data, these header parameters 5 are established once by the main processor unit 3.

On creation of the connection in a device which for example works to the H.323 standard, the following steps are performed by the main processor 3:
1. Registration, admission and status (RAS). An H.323 client thus registers with an administration unit (gatekeeper) which is competent for the corresponding network zone (for example in a TP multicast using UDP ("User Datagram Protocol") and requests permission to establish the connection.
2. Then a TCP ("Transmission Control Protocol") connection is created to the corresponding (called) H.323 server. The call is established via a H.225.0 protocol (similar to a Q.931 call construction) via the TCP connection.
3. The logic channels between caller and called party are then constructed, again via TCP following the H.245 standard.

In the present example the header parameters 5 generated contain Ethernet header parameters 5A comprising an Ethernet connection for example in a LAN, IP header parameters 5B containing information on the connection to an IP network such as the Internet, and UDP header parameters 5C containing information on the "User Datagram" protocol which is typically used to send speech data. These header parameters 5 are sent via the two parts of the second data path c, d to the co-processors 1 and 2, and there stored for reference purposes. A data packet 6 received via the data path a also contains such header parameters 6A, 6B and 6C and also the actual data 6D in the case of speech data RTP ("Real-time Protocol") real-time speech data.

The header parameters 6A, 6B, 6C are compared with the correspondingly stored header parameters 5A, 5B, 5C. If the parameters match such that it can be ensured that the data comes from the corresponding connection for reception of speech data, the data packet 6 is classified as a first data packet type and passed on via the first data path b to the further co-processor 2. This can continue the classification in particular when processing the data. If classification in the packet processor 1 or in the speech co-processor 2 shows that this is not speech data, the data packet is passed to the main processor 3. Otherwise it is processed by the speech co-processor 2.

Figure 3:
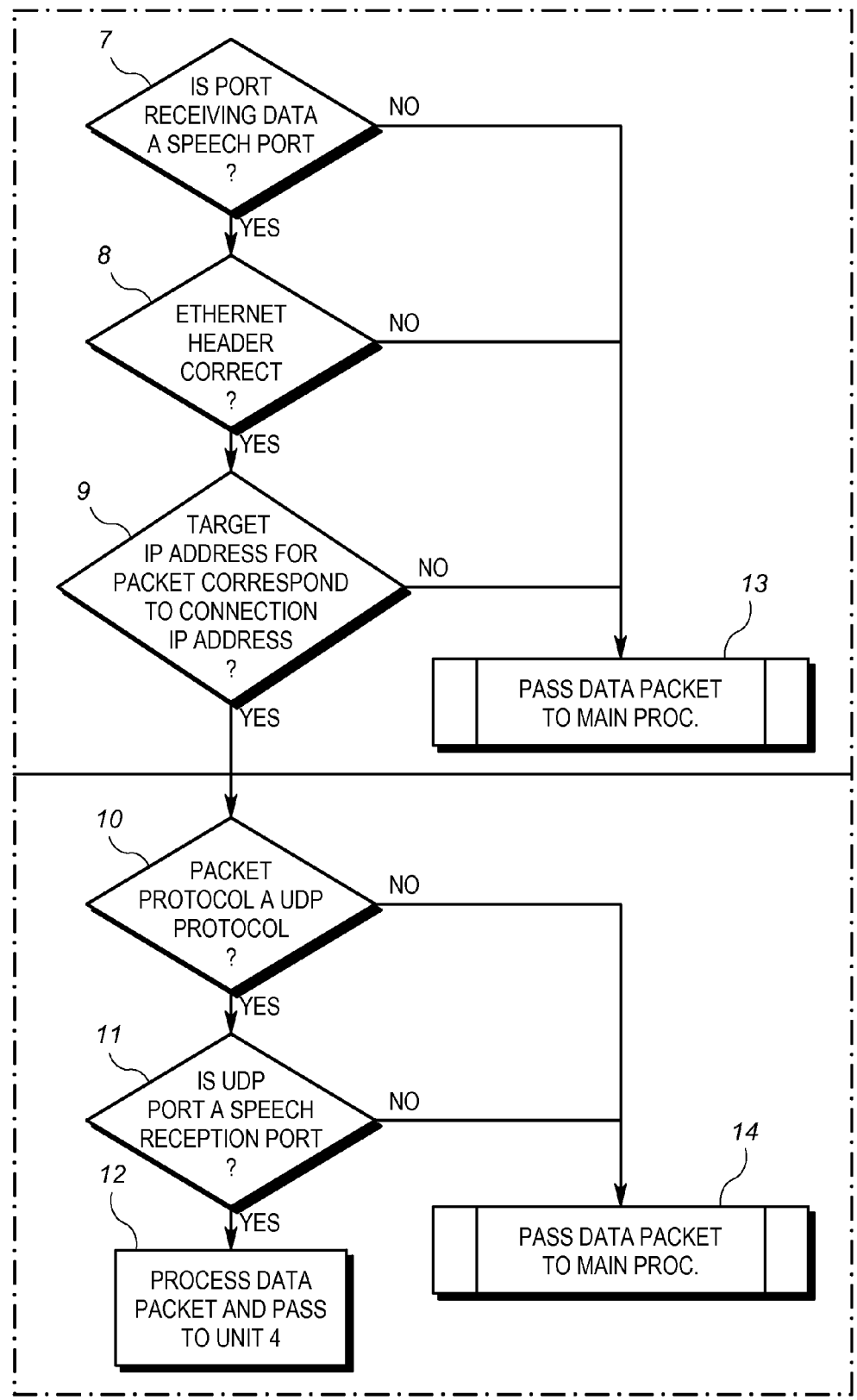
FIG. 3 shows a flow diagram which shows an embodiment example for the classification of data packets according to the invention.

FIG. 3 shows this classification in more detail using a flow diagram. In a first step 7 it is checked whether the port on which the data packet was received is the port provided for the respective connection for reception of speech data. This is particularly important if several connections are active simultaneously. If so (J), we proceed to the next step 8, whereas if not (N) we proceed to step 13 in which the corresponding data packet is passed to the main processor unit 3.

In the next step 8 it is checked whether the Ethernet header 6A contains the correct connection type e.g. IP for the connection concerned. If so, proceed to step 9, if not again proceed to step 13.

In step 9 it is checked whether the target IP address of the data packet received corresponds to the IP address provided for the connection. If not, again proceed to step 13. These first three classification steps 7 to 9 are for example performed in a packet co-processor 1. They allow classification at low level as only elementary communication parameters are checked.

If a match is found in step 9, the data packet is passed to the speech co-processor 2 for further treatment. There in step 10 it is checked whether the protocol of the data packet received is a UDP protocol. If not, proceed to step 14 which means that the data packet is again passed to the main processor 3. If so, proceed to step 11. Here it is checked whether the UDP port is the port for speech data reception. This is used in order to distinguish between the so-called RAS ("Registration, Admission and Status") and speech data packets. If not, again proceed to step 14. If so, in step 12 the data packet is processed and the processed data optionally passed to the unit 4 shown in FIG. 1 for further processing and speech output. The division of steps 7 to 11 between the packet co-processor 1 and the speech co-processor 2 is in principle arbitrary.

In the subsequent unit 4 for example the actual processing of the speech data can be performed, whereas in the speech co-processor 2 substantially the UDP protocol is processed.

In total in such a device the main processor 3 processes the corresponding application protocol stack (H.323 USW), the TCP connection, the Internet connection and the interfaces to the network (Ethernet, ATM etc). For classification, the co-processors process only a reduced part of the protocol stack, for example parts of the Internet (IP) protocol, the "User Datagram" protocol (UDP) and the network interface (e.g. Ethernet). The actual speech or other real-time data (RTP data) are for example processed by a unit arranged after the second co-processor.

Figure 4:
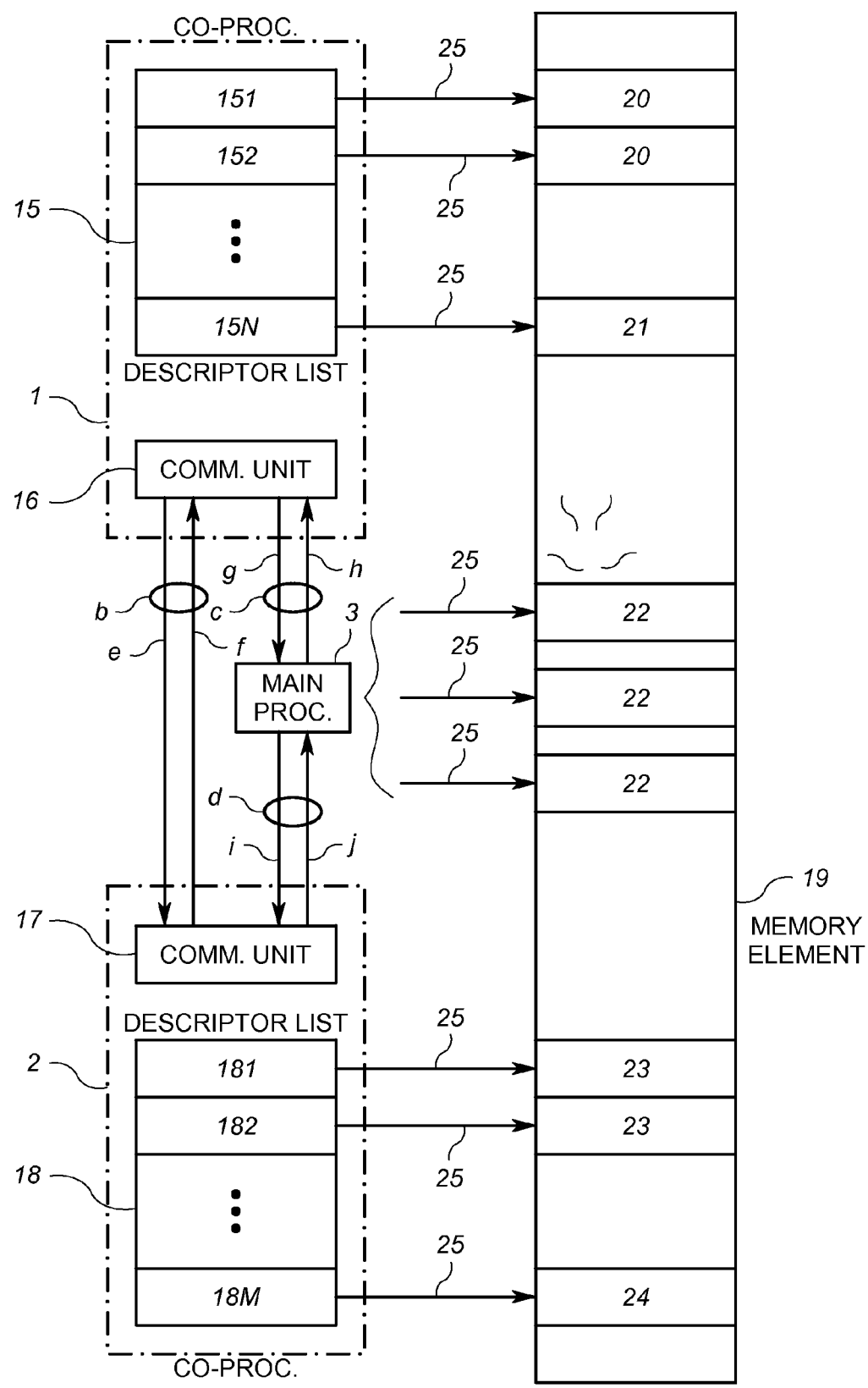
FIG. 4 shows a block diagram which depicts a possible memory administration of the device according to the invention from FIG. 1.

FIG. 4 shows the memory administration and transfer of the data packets between the co-processors 1, 2 and the central processor 3 in more detail.

Here the packet co-processor 1 comprises a packet memory 15 with a list of descriptors 151, 152, . . . 15N. Each of these descriptors 151, 152, . . . 15N contains a pointer 25 to a memory area 20, 21 in a memory element 19, for example, an SDRAM. The list of descriptors is known to a DMA ("Direct Memory Access") unit (not shown) which receives the data. Incoming packets are stored in the corresponding memory areas 20, 21 where in the present example the memory areas 20 are filled with received data packets while the memory area 21 is still free. When a data packet has been received completely and stored in a corresponding memory area 20, this is reported to the packet co-processor 1, for example by an interrupt. The packet co-processor 1 classifies the data packet as described above. If the data packet is classified as a second data packet type i.e. not a real-time data packet, the data packet is passed to the main memory 3 as indicated by arrow g. This takes place for example in that the associated descriptor is transferred with the pointer to the corresponding memory area. In return the main processor 3 allocates a new free memory area 21 to the packet co-processor 1 so that the list in the packet memory 15 always has sufficient descriptors and pointers to free memory areas (arrow h). Communication in the packet co-processor 1 is performed via a unit 16.

If however it is a data packet of the first data packet type, i.e. real-time data packet, the corresponding pointer to the data packet is passed to the speech co-processor 2 as indicated by arrow e. In the speech processor 2, as in the packet co-processor 1, a unit 17 is provided for communication. Furthermore the speech co-processor 2 contains a stored list 18 with descriptors 181, 182, . . . 18M, which again contain pointers 25 to memory areas 23, 24 allocated to the speech co-processor 2. The memory areas 23 contain packets already classed as speech data packets by the packet co-processor 1 while memory area 24 is still free. If the speech co-processor 2 as described above now receives a descriptor or pointer to a new speech data packet, in return it sends a pointer 25 to a free memory section back to the packet co-processor 1 (arrow f). If, as possible in FIG. 3 in steps 10 and 11, the speech co-processor notices that the data packet is not a speech data packet, the pointer to the data packet is passed to the main processor 3 and in return a pointer received to a free memory area, as shown by arrows i and j.

It should be noted that in the communication indicated by arrows e and f, only pointers to memory areas are exchanged which were previously allocated by the main processor to the respective co-processors. The co-processors thus cannot independently release memory areas but receive a particular list of memory areas allocated by the main processor 3.

As shown from the description above, the arrows e, f shown in FIG. 4 correspond to a communication over the first data path b, while arrows g, h correspond to a communication over the first part c of the second data path and arrows i, j to a communication over the second part d of the second data path.

It should again be pointed out that this precise form of memory administration is merely one example. Other architectures are also possible here. Also the present invention is not restricted to the transmission of speech data, but other real-time data can be transmitted such as for example video data. For example data for real-time control or monitoring would also be conceivable.

The invention claimed is:

1. A method for processing a plurality of data packets which include real-time data packets, the method comprising:
   a) classifying the plurality of data packets into at least one first data packet type and a second data packet type, wherein real-time data packets are allocated to the first data packet type and wherein the second data packet type is different from the first data packet type;
   b) processing the data packets of the first data packet type via a first data path; and
   c) processing the data packets of the second data packet type via a second data path,
   wherein the data packets of the first data packet type are transmitted via the first data path to a first processor unit operable to process the real-time data packets, and wherein the data packets of the second data packet type are transmitted via the second data path to a second processor unit operable to process the data packets of the second data packet type,
   wherein the data packets are classified at least partly in a third processor unit and depending on classification are transmitted to the first processor unit or the second processor unit,
   wherein the second processor unit is a main processor unit and wherein the first processor unit and third processor unit are co-processor units, and
   wherein the classification takes place temporally in a plurality of stages and after each stage the data packets are transmitted for processing to the main processor unit if they are classified as data packets of the second data packet type.

2. The method according to claim 1, wherein data packets including control or signal information are allocated to the second data packet type.

3. The method according to claim 1, wherein the first data path has a shorter delay in processing data packets than the second data path.

4. The method according to claim 1, wherein connection data for the exchange of real-time data packets with a communication device is stored and wherein the data packets are classified as data packets of the first data packet type if at least part of the connection data of the data packets corresponds with the stored connection data.

5. The method according to claim 1, wherein the data packets are classified using a port at which the data packets are received.

6. The method according to claim 1, wherein the data packets are classified using a network address contained in the data packets.

7. The method according to claim 1, wherein the data packets are classified as real-time data packets if they contain a protocol provided for the transmission of real-time data.

8. The method according to claim 7, wherein the data packets are classified as real-time data packets if the protocol provided for the transmission of real-time data refers to a real-time data port for reception of the real-time data packets.

9. The method according to claim 1, wherein the main processor unit allocates to the co-processor units memory areas for storage of data packets.

10. The method according to claim 1, wherein an availability of the first data path is checked and wherein the data packets classified as data packets of the first data packet type are transmitted for processing via the second data path if the availability of the first data path does not meet an availability threshold.

11. The method according to claim 1, wherein the utilization of the first data path is measured and the data packets classified as data packets of the first data packet type are transmitted for processing via the second data path if the utilization of the first data path exceeds a pre-specified value.

12. The method according to claim 1, wherein the data packets are received via an IP transmission network.

13. The method according to claim 1, wherein the real-time data packets comprise speech data.

14. A device configured to process data packets which include real-time data packets, the device comprising:
   a first processor configured to classify the data packets into at least one first data packet type and a second data packet type,
   wherein the first processor is operable to allocate real-time data packets to the first data packet type and wherein the second data packet type is different from the first data packet type;
   a first data path configured to process data packets of the first data packet type; and
   a second data path configured to process data packets of the second data packet type,
   wherein the second data path comprises a main processor unit, wherein the first data path comprises a first co-processor unit configured to process the data packets of the first data packet type, wherein the first processor comprises a second co-processor unit, and wherein the first co-processor unit is connected via the first data path with the second co-processor unit and via the second data path with the main processor unit, and wherein both the first coprocessor unit and the second co-processor unit are configured to classify the data packets into at least the first data packet type and the second data packet type, where the classification takes place in the first co-processor unit and in the second co-processor unit on the basis of different criteria, and wherein the first co-processor unit and the second co-processor unit are operable to transmit the data packets of the second data packet type to the main processor unit for processing.

15. The device according to claim 14, wherein the first processor is operable to allocate data packets with control or signal information to the second data packet type.

16. The device according to claim 14, wherein the first data path is configured with a shorter delay in processing data packets than the second data path.

17. The device according to claim 14, wherein the first processor is
configured to store connection data for the exchange of real-time data packets with a communication device and wherein the first processor is operable to classify the data packets as data packets of the first data packet type if at least part of the connection data of the data packets corresponds with the stored connection data.

18. The device according to claim 14, wherein the first processor is operable to classify the data packets using a port at which the data packets are received.

19. The device according to claim 14, wherein the first processor is operable to classify the data packets using a network address included in the data packets.

20. The device according to claim 14, wherein the first processor is operable to classify the data packets as real-time data packets if they contain a protocol provided for the transmission of real-time data.

21. The device according to claim 20, wherein the first processor is operable to classify the data packets as real-time data packets if the protocol provided for the transmission of real-time data refers to a real-time data port for reception of the real-time data packets.

22. The device according to claim 14, wherein the main processor unit allocates to the first co-processor unit and the second co-processor unit memory areas for storage of data packets.

23. The device according to claim 22, wherein the processor is configured to classify the data packets temporally in a plurality of stages, wherein after each of the plurality of stages the data packets are transmitted for processing to the main processor unit if the data packets are classified as data packets of the second data packet type.

24. The device according to claim 14, the first processor is operable to check the availability of the first data path, and wherein the first processor is operable to transmit for processing data packets classified as data packets of the first data packet type via the second data path if the availability of the first data path does not meet an availability threshold.

25. The device according to claim 14, wherein the first processor is operable to measure utilization of the first data path, and wherein the first processor is operable to transmit for processing data packets classified as data packets of the first data packet type via the second data path if the utilization of the first data path exceeds a prespecified value.

26. The device according to claim 14, wherein the first processor is configured to receive the data packets via an IP transmission network.

27. The device according to claim 14, wherein the real-time data packets comprise speech data.

* * * * *